Dec. 19, 1939.　　　S. J. FUIKS　　　2,184,073
MINNOW SNARE
Filed May 19, 1939
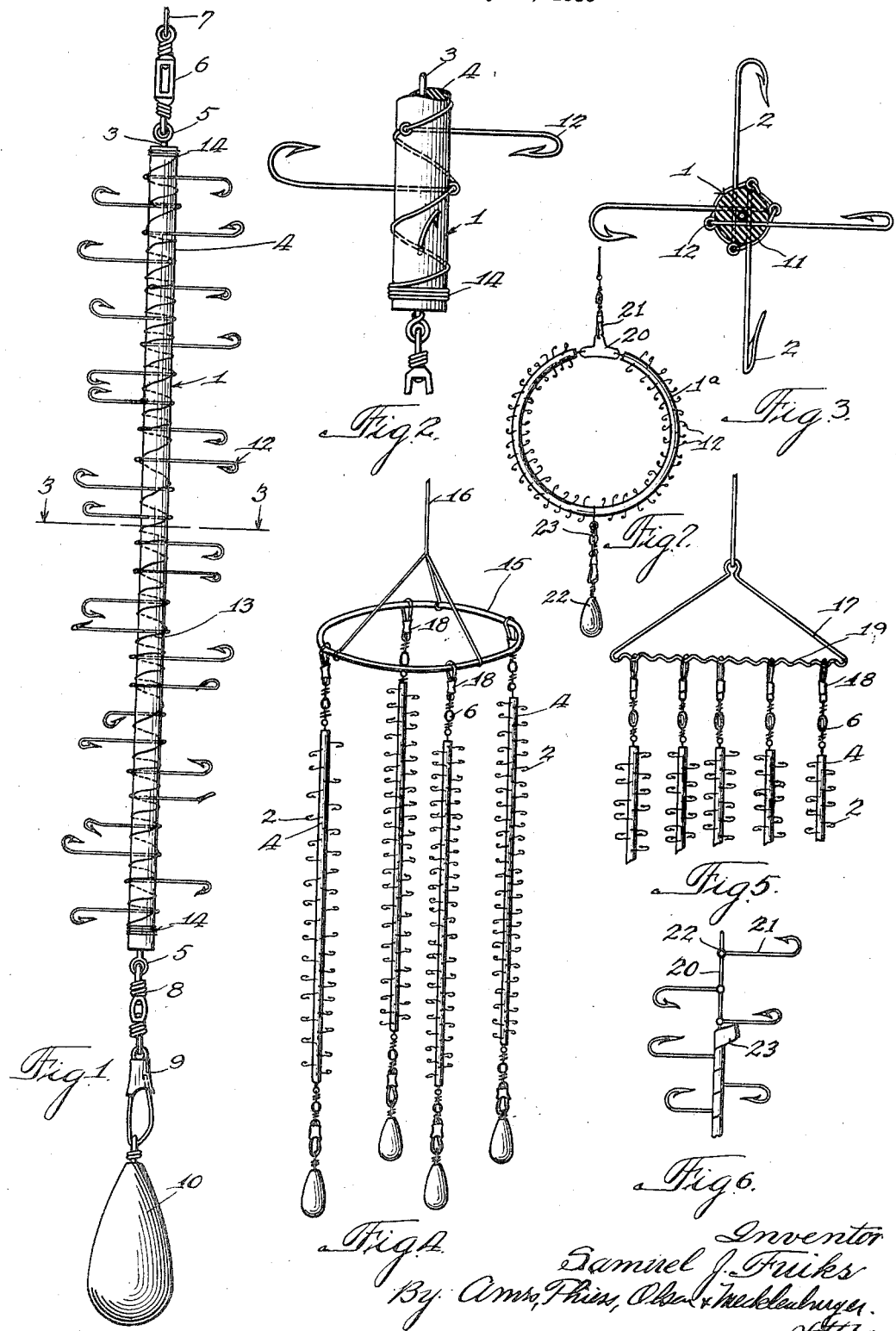

Patented Dec. 19, 1939

2,184,073

UNITED STATES PATENT OFFICE 2,184,073

MINNOW SNARE

Samuel J. Fuiks, Chicago, Ill.

Application May 19, 1939, Serial No. 274,576

9 Claims. (Cl. 43—6)

This invention relates to a minnow snare or trap, and more particularly to a snare adapted to be suspended in the water and which is constructed in such a manner that small minnows may be snared thereon.

It is an object of the present invention to provide a snare unit of the type described which is provided with a large number of radially extending hooks distributed over a comparatively long attenuated member and which may be supported in the water in such a manner that minnows passing thereby in any direction may be snared thereon.

The invention also contemplates a snare or trap in which a plurality of the individual snare units are distributed in such a manner as to form an enclosure therebetween; also in which the individual snaring members are distributed in such a manner as to be considerably more effective than when a single unit is used alone.

Another object of the invention is to provide a comparatively long attenuated flexible support member having a large number of radially extending and preferably somewhat elongated hooks distributed over its entire length and having means at one end for the attachment of a supporting line and at the opposite end means for supporting a suitable weight or sinker. The line may be attached to a boat or any other object whereby the snare may be pendently supported and the elongated member swivelly supported in such a manner that it may easily be rotated between the line and sinker without rotating either one. In other words, the trap member itself is swivelly supported so that, as the minnows strike the hooks, the device may rotate slightly in either direction, which rotating action will increase the chance of the minnows' being snared on the hooks.

The maintenance of live minnows for bait is always a problem to the fisherman, and minnows are ordinarily first caught and then kept in a large pail or other receptacle having water therein or which may be suspended over the side of the boat. Minnows kept in this manner often die from lack of oxygen. In the present invention they may be kept alive in their natural element until required for use.

The present invention is adapted to be pendently supported on the boat or other suitable supports and may be pulled up at any time when fresh bait is required. In this manner fresh live minnows may be secured at the time wanted for use.

A further object is the provision of a minnow snare of the character described which will be cheap to manufacture, easy to assemble, and convenient in use.

Further objects will be apparent from the specification and the appended claims.

In the drawing:

Fig. 1 is a side elevation of one embodiment of the invention and illustrates a single snare unit attached to a supporting line and provided with a suitable weight.

Fig. 2 is a fragmentary detail section of the lower end of the snare member illustrated in Fig. 1.

Fig. 3 is a transverse sectional view through the embodiment illustrated in Figs. 1 and 2 and is taken on a line substantially corresponding to line 3—3 of Fig. 1.

Fig. 4 is a perspective view illustrating the use of a plurality of the individual snare members to provide a so-called multiple snare device.

Fig. 5 is a fragmentary detail view illustrating a slightly different embodiment of multiple snare device.

Fig. 6 is a fragmentary detail view of a slightly different embodiment of the body member of the snare.

Fig. 7 is a view of a further modified snare.

Referring to the drawing in detail, the embodiment illustrated comprises an elongated member 1 having a plurality of horizontally extending, radially distributed hooks 2 secured thereto. The hooks may be randomly distributed in any desired manner, but are preferably in a spiral-like arrangement over the length of the member 1. The member 1 preferably comprises an elongated section of heavily insulated flexible wire. This wire may be of any suitable type but preferably comprises a single metal wire core 3 which is preferably a flexible multiple strand wire, such as ordinarily used in electrical devices. This wire core is provided with a comparatively thick waterproof insulation 4, and, in fact, the usual heavily insulated rubber covered wire is suitable for the purpose. It is, of course, desirable that the hook supporting member should be comparatively flexible throughout its length. The wire 3 is formed at each end of the member to provide loops 5 to which may be connected other elements of the device.

The upper end of the snare is provided with a swivel 6 secured to the adjacent wire loop 5, and any suitable line 7 is secured to this swivel 6 for supporting the snare unit. The opposite end of the snare member is provided with a swivel 8 which is secured to the adjacent wire loop 5, and a snap 9 is secured to the swivel for the purpose of supporting a suitable weight or sinker 10, as shown. The snap 9 is preferably of the usual safety pin type commonly used on fishing tackle.

The hooks 2 are preferably comparatively long and formed of small diameter resilient wire, although it will be understood that any suitable minnow snaring members may be used. In assembling these hooks on the body member 1, the rubber-like covering or insulation 4 of the member 1 is provided with a plurality of transverse perforations 11 (Fig. 3) and the hooks are extended therethrough in an arrangement substantially as illustrated in Fig. 3 with the eyes 12 of the hooks snugly adjacent the body member 1. After these hooks are positioned as shown, they are secured in place by means of a strand 13 which may be of any suitable type, preferably similar to a heavy waterproofed linen or silk thread. This strand may be spirally wound on the body member and extends through all of the hook eyelets 12, the ends of the strand being wound around the ends of the body member 1 and secured thereto in any suitable manner as shown at 14. It will be apparent that "gut" or a fine flexible wire may be used for securing the hooks in the same manner if desired.

Fig. 4 illustrates an embodiment comprising a plurality of the individual snare units arranged to provide a snare or trap enclosure. With this type of snare the minnows which pass inwardly between the individual snares are apt to be caught on some of the hooks as they attempt to pass outwardly. In this embodiment a ring-like member 15 of any desired shape may be supported on a line 16 in the manner illustrated, and each of the snare units is provided at its upper end with a safety pin snap member 18 secured to the swivel 6 in place of the line shown in Fig. 1. These snaps 18 may be hooked over the ring member 15 and any desired number of the individual snares may be supported thereon and distributed as desired.

Fig. 5 illustrates another embodiment of the multiple snare device in which a substantially triangular wire support 17 is provided having its horizontal portion 19 formed to provide an elongated sinuous member substantially as illustrated. In this embodiment, the individual snare units are provided with snaps 18, in the same manner as shown in Fig. 4, for supporting the individual snare units on the sinuous bar 19. The sinuous shape of the bar 19 tends to prevent the units from getting out of place after they are hooked thereon. The ring 15 of the embodiment shown in Fig. 4 may be provided with suitable notches or depressions for retaining the snares in spaced relation, or it may be sinuously shaped if desired.

Fig. 6 is a fragmentary detail view of a slightly different embodiment in which the body member of the device is formed of a single flexible wire 20, and radially disposed hooks 21 are secured at intervals to this wire 20. The hooks may be secured by soldering at 22 or in any other suitable manner. The wire 20 may be provided with swivels and a sinker, in the same manner as shown in Fig. 1. Also, the wire 20 is preferably spirally wrapped with heavy adhesive tape 23 with the ends secured in place in any suitable manner.

In Fig. 7 the elongated body member 1a may be similar to that previously described and similarly provided with laterally extending hooks 12. In this embodiment the body member 1a may be in the form of a loop, as shown, with its ends connected to a suitable support 20 having a swivel 21 connected thereto, to which the line 7 may be connected. At the bottom end of the loop and intermediate the ends of the body member, a weight 22 is supported by means of a swivel 23 attached to the body member, as shown. This device may swivelly operate between the line and weight in the same manner as the embodiments previously described.

The present invention is not in any sense a lure or bait but is intended solely as a snare or trap for small minnows. The flexibility and free rotation of the snare member is of considerable importance as it greatly increases the possibility of the minnows' being snared even though they first strike the shank or, in fact, any portion of a hook other than the point.

Modifications may be made without departing from the spirit of the invention, and it is therefore desired that the invention be limited only by the prior art and the scope of the appended claims.

Having thus described this invention, what is claimed and desired to be secured by Letters Patent is:

1. A minnow snare comprising an elongate flexible member having radially distributed outwardly extending hooks with the shanks of said hooks extending through and supported in said member, and means extending through the eyes of said hooks and adapted to secure them against longitudinal movement.

2. A minnow snare comprising an elongate flexible member having radially distributed outwardly extending hooks with the shanks of said hooks extending through and supported in said member, and a flexible strand spirally wound on said member and extending through the eyes of said hooks to secure them against longitudinal movement while permitting a degree of rotary movement.

3. A minnow snare comprising a length of flexible wire having a comparatively thick rubber-like insulation covering, and radially distributed outwardly extended hooks having their shanks supported in said insulating material.

4. A minnow snare comprising a length of flexible wire having a comparatively thick rubber-like insulation covering, radially distributed outwardly extended hooks having their shanks supported in said insulating material, and a spirally wound flexible strand extending through the eyes of said hooks and secured to said member.

5. A minnow snare comprising a long slender flexible member having radially distributed outwardly extending resilient hooks distributed over its length, a swivel on one end of said member for pendently supporting said member on a line, a weight on the opposite end of said member, and a swivel between said weight and said member, said weight being sufficiently heavy to retain said member in vertical position when suspended in water and to enable said member to be rotated between said swivels when said hooks are struck by minnows.

6. A minnow snare comprising an elongated flexible wire having a comparatively thick rubber-like covering, a plurality of hooks extending laterally through and supported by said covering whereby they are resiliently supported, said hooks being radially distributed over the length of said wire, means for securing said hooks against material longitudinal movement, a sinker on one end of said snare, and means for swivelly supporting said wire between a line and said sinker.

7. A minnow snare of the character described comprising a plurality of elongated snare units, each having radially positioned hooks distributed over its length and each unit being provided with a weight at its lower end, a supporting member for said snare units and arranged to support said units in spaced relation to provide an enclosure therebetween.

8. A multiple snare device of the character described comprising a horizontally positioned elongated support member and a plurality of snare units supported thereon, said snare units each comprising an elongated flexible body portion having a swivel at each end and laterally extending hooks radially distributed over its length, means secured to the upper swivel for supporting said snare member on said support member, and a sinker supported on the opposite swivel, said sinker being of sufficient weight to enable the snare member to be rotated between its support and the sinker by minnows striking said hooks.

9. A minnow snare unit comprising an elongated flexible wire, radially distributed outwardly extending hooks secured to said wire and distributed over its length, a waterproof tape covering wound on said wire between said hooks, and a sinker on one end of said wire.

SAMUEL J. FUIKS.